(12) United States Patent
Nam et al.

(10) Patent No.: US 11,601,931 B2
(45) Date of Patent: Mar. 7, 2023

(54) PAGING PROCEDURE ENHANCEMENT

(71) Applicant: QUALCOMM Incorporated, San Diego, CA (US)

(72) Inventors: Wooseok Nam, San Diego, CA (US); Tao Luo, San Diego, CA (US); Juan Montojo, San Diego, CA (US); Peter Pui Lok Ang, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/177,009

(22) Filed: Feb. 16, 2021

(65) Prior Publication Data

US 2021/0258930 A1 Aug. 19, 2021

Related U.S. Application Data

(60) Provisional application No. 62/978,290, filed on Feb. 18, 2020.

(51) Int. Cl.
*H04W 72/04* (2009.01)
*H04W 68/02* (2009.01)
(Continued)

(52) U.S. Cl.
CPC ......... *H04W 72/042* (2013.01); *H04L 5/0048* (2013.01); *H04W 68/02* (2013.01); *H04W 52/0235* (2013.01); *H04W 76/28* (2018.02)

(58) Field of Classification Search
CPC ............... H04W 72/042; H04W 68/02; H04W 52/0235; H04W 76/28; H04W 88/02; H04W 88/08; H04W 68/025; H04W 56/001; H04W 52/0225; H04L 5/0048; H04L 5/0091; H04L 41/0896; H04L 5/0023; Y02D 30/70

See application file for complete search history.

(56) References Cited

U.S. PATENT DOCUMENTS

2008/0219199 A1* 9/2008 Kohlmann ........ H04W 52/0225
370/311
2018/0288737 A1* 10/2018 Islam .................. H04W 72/042
(Continued)

FOREIGN PATENT DOCUMENTS

WO 2017079574 A1 5/2017
WO 2019139769 A1 7/2019

OTHER PUBLICATIONS

International Search Report and Written Opinion—PCT/US2021/018356—ISA/EPO—dated Jun. 8, 2021.
(Continued)

*Primary Examiner* — Kiet Tang
(74) *Attorney, Agent, or Firm* — Patterson + Sheridan, L.L.P.

(57) ABSTRACT

Certain aspects of the present disclosure relate to wireless communications, and more particularly, techniques for an enhanced paging procedure. A method that may be performed by a user equipment (UE) includes detecting, during a paging occasion (PO), at least one downlink control information (DCI) that indicates a paging message and additional downlink signals and using the additional downlink signals to enhance processing of the paging message.

29 Claims, 11 Drawing Sheets

(51) Int. Cl.
*H04L 5/00* (2006.01)
*H04W 76/28* (2018.01)
*H04W 52/02* (2009.01)

(56) References Cited

U.S. PATENT DOCUMENTS

2019/0254110 A1* 8/2019 He .................. H04L 41/0896
2019/0356444 A1* 11/2019 Noh .................. H04L 5/0023

OTHER PUBLICATIONS

Qualcomm Incorporated: "Remaining Issues on TRS", 3GPP Draft; R1-1804795, 3GPP TSG RAN WG1 Meeting #92bis, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), XP051427062, pp. 1-3, Retrieved from the Internet: URL:http://www.3gpp.org/ftp/Meetings%5F3GPP%5FSYNC/RAN1/Docs/ [retrieved on Apr. 15, 2018] The Whole Document, Par. 2.

* cited by examiner

PAGING PROCEDURE ENHANCEMENT

CROSS-REFERENCE TO RELATED APPLICATION(S)

This application claims benefit of and priority to U.S. Provisional Application No. 62/978,290, filed Feb. 18, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for enhancing a paging procedure.

Description of the Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, or other resources). Multiple-access technologies can rely on any of code division, time division, frequency division, orthogonal frequency division, single-carrier frequency division, or time division synchronous code division multiple access (TD-SCDMA) systems, to name a few. These and other multiple access technologies have been adopted in various telecommunication standards to provide a common protocol that enables different wireless devices to communicate on a municipal, national, regional, and even global level.

Although wireless communication systems have made great technological advancements over the years, challenges still exist. For example, challenges may include degraded performance and high power consumption by a UE in an IDLE/INACTIVE mode discontinuous reception (I-DRX) performing processing of paging messages. Consequently, there exists a need for further improvements in wireless communications systems to overcome various challenges.

SUMMARY

Certain aspects can be implemented in a method for wireless communications by a user equipment (UE). The method generally includes detecting, during a paging occasion (PO), a paging downlink control information (DCI) that indicates a paging message and additional downlink signals and using the additional downlink signals to enhance processing of the paging message.

Certain aspects can be implemented in an apparatus for wireless communications by a UE. The apparatus may include a processing system, comprising: a memory comprising computer-executable instructions and one or more processors configured to execute the computer-executable instructions and cause the processing system to detect, during a PO, a paging DCI that indicates a paging message and additional downlink signals and using the additional downlink signals to enhance processing of the paging message.

Certain aspects can be implemented in an apparatus for wireless communications by a UE. The apparatus may include means for detecting, during a PO, a paging DCI that indicates a paging message and additional downlink signals and means for using the additional downlink signals to enhance processing of the paging message.

Certain aspects can be implemented in a non-transitory computer-readable medium for wireless communications by a UE. The non-transitory computer-readable medium may comprise computer-executable instructions that, when executed by one or more processors of a processing system, cause the processing system to detect, during a PO, a paging DCI that indicates a paging message and additional downlink signals and using the additional downlink signals to enhance processing of the paging message.

Certain aspects can be implemented in a computer program product for wireless communications by a UE embodied on a computer-readable storage medium. The computer-readable storage medium may comprise code for detecting, during a PO, a paging DCI that indicates a paging message and additional downlink signals and code for using the additional downlink signals to enhance processing of the paging message Certain aspects can be implemented in a method for wireless communications by a network entity. The method generally includes transmitting to a UE, during a PO, a paging DCI that indicates a paging message and additional downlink signals, transmitting the paging message, and transmitting the additional downlink signals in accordance with the indication.

Certain aspects can be implemented in an apparatus for wireless communication by a network entity. The apparatus may include a processing system, comprising: a memory comprising computer-executable instructions and one or more processors configured to execute the computer-executable instructions and cause the processing system to transmit to a UE, during a PO, a paging DCI that indicates a paging message and additional downlink signals, transmit the paging message, and transmit the additional downlink signals in accordance with the indication.

Certain aspects can be implemented in an apparatus for wireless communication by a network entity. The apparatus may include means for transmitting to a UE, during a PO, a paging DCI that indicates a paging message and additional downlink signals, means for transmitting the paging message, and means for transmitting the additional downlink signals in accordance with the indication.

Certain aspects can be implemented in a non-transitory computer-readable medium for wireless communication by a network entity. The non-transitory computer-readable medium may comprise computer-executable instructions that, when executed by one or more processors of a processing system, cause the processing system to transmit to a UE, during a PO, a paging DCI that indicates a paging message and additional downlink signals, transmit the paging message, and transmit the additional downlink signals in accordance with the indication.

Certain aspects can be implemented in a computer program product for wireless communication by a network entity embodied on a computer-readable storage medium. The computer-readable storage medium may comprise code for transmitting to a UE, during a PO, a paging DCI that indicates a paging message and additional downlink signals, code for transmitting the paging message, and code for transmitting the additional downlink signals in accordance with the indication The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide apparatus, methods, processing systems, and computer readable mediums for enhancing a paging procedure.

In NR, cell-specific reference signal (CRS) resources may be assigned for CONNECTED mode discontinuous reception (DRX) UEs via radio resource control (RRC) signaling. For IDLE/INACTIVE mode DRX (I-DRX) UEs, synchronization signal blocks (SSBs)/physical broadcast channel (PBCH) blocks may be used for channel tracking and cell search/reselection for paging. However, SSB density may be much lower than CRS density in LTE, thus, the paging performance and power consumption for NR may be impacted.

For example, in some cases, the closest SSB, following a PO, may be significantly later in time such that it impacts the UE's performance and power consumption. Accordingly, in some cases the UE may need to maintain powered on RF components during the time gap between the SSB and the PO. In some other cases, the UE may need to wake-up multiple times to monitor for SSBs and POs.

Additionally, a UE in an IDLE/INACTIVE mode often may not have enough resources for maintaining synchronization to the BS. For this reason, paging enhancements, including means for providing tracking reference signal or channel state information reference signal (TRS/CSI-RS) resources to IDLE/INACTIVE mode UEs, have been considered in advanced systems (e.g., for NR Rel-17). More specifically, according to aspects of the present disclosure, aperiodic TRSs (A-TRSs) or repeated paging messages may be indicated in a PO and may be used by the UE to enhance processing of a paging message.

Introduction to Wireless Communication Networks

Figure 1:
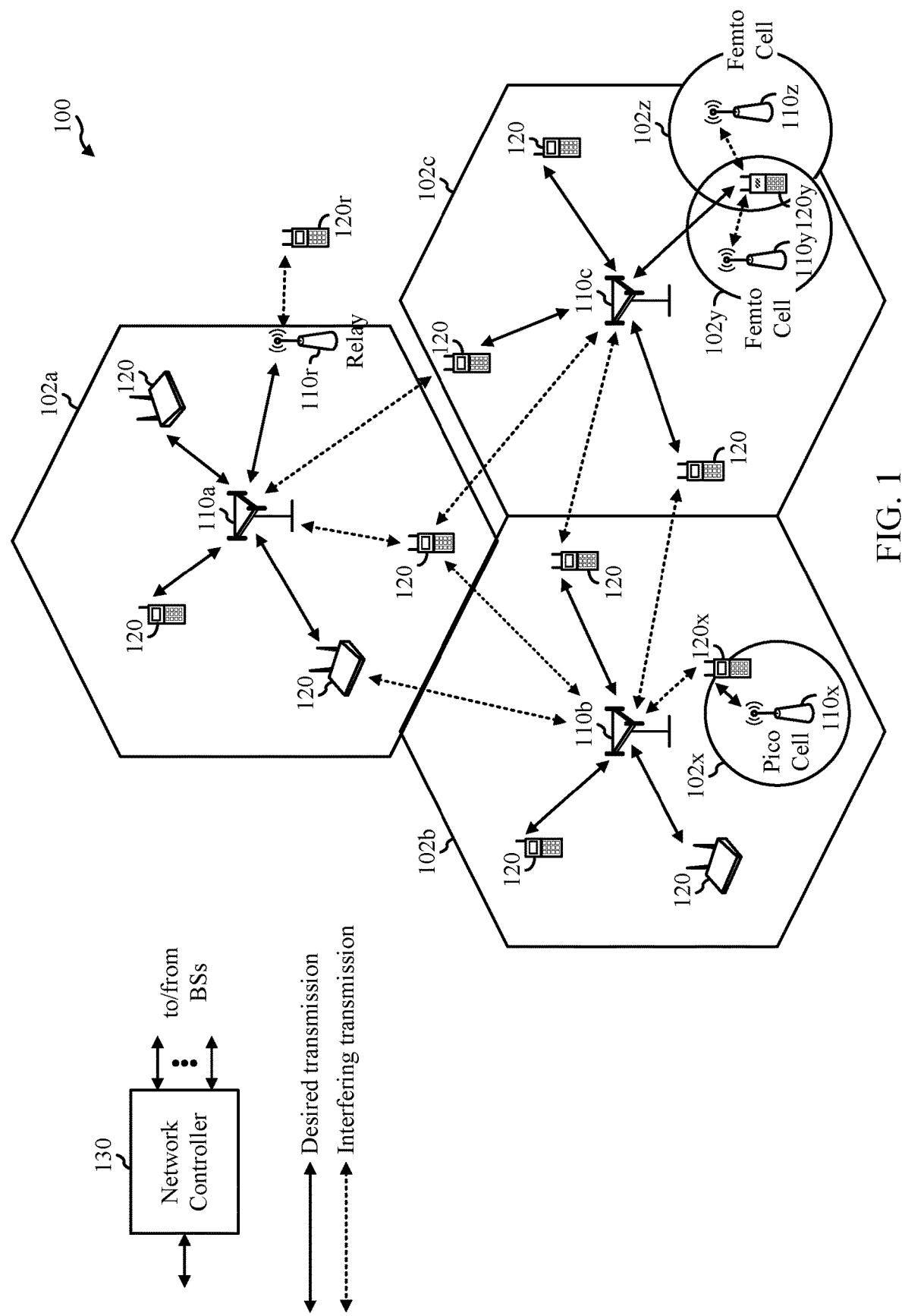
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may include one or more UEs 120 and one or more BSs 110 configured to participate in an enhanced paging procedure according to operations 700 and 800 of FIGS. 7 and 8 described below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks (RBs)), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the DL and/or UL. A finely dashed line with double arrows indicates interfering transmissions between a UE and a BS.

Figure 2:
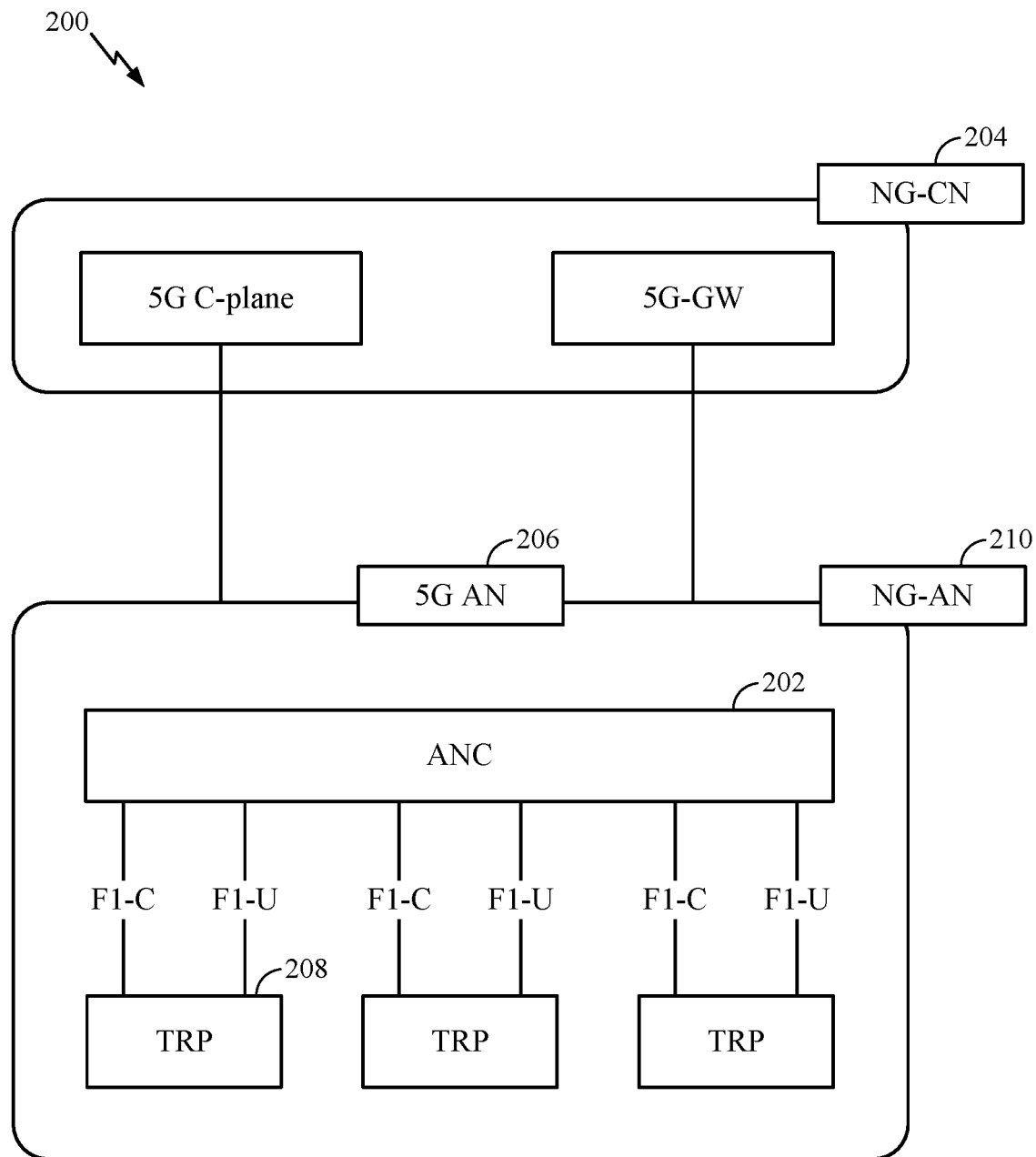
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
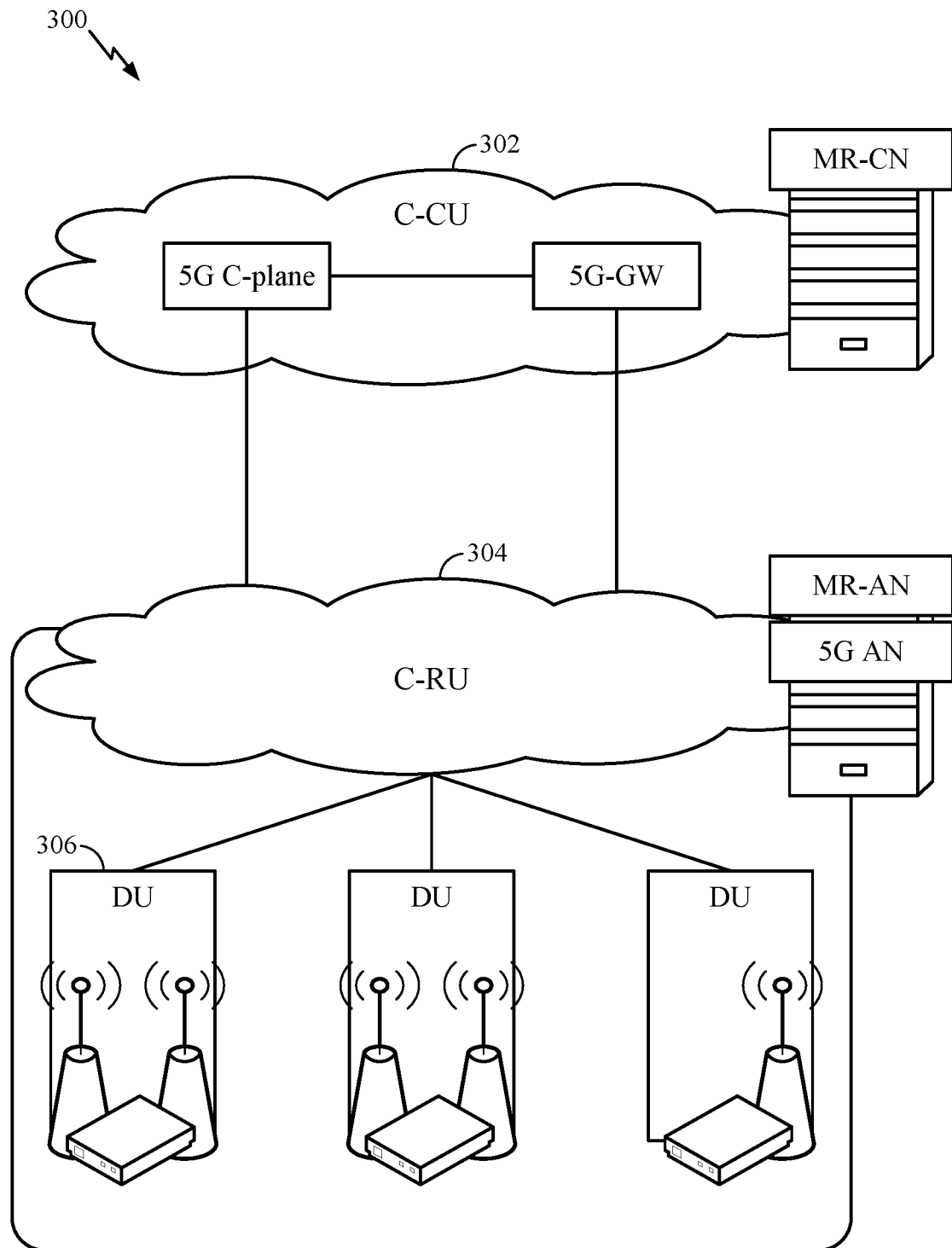
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
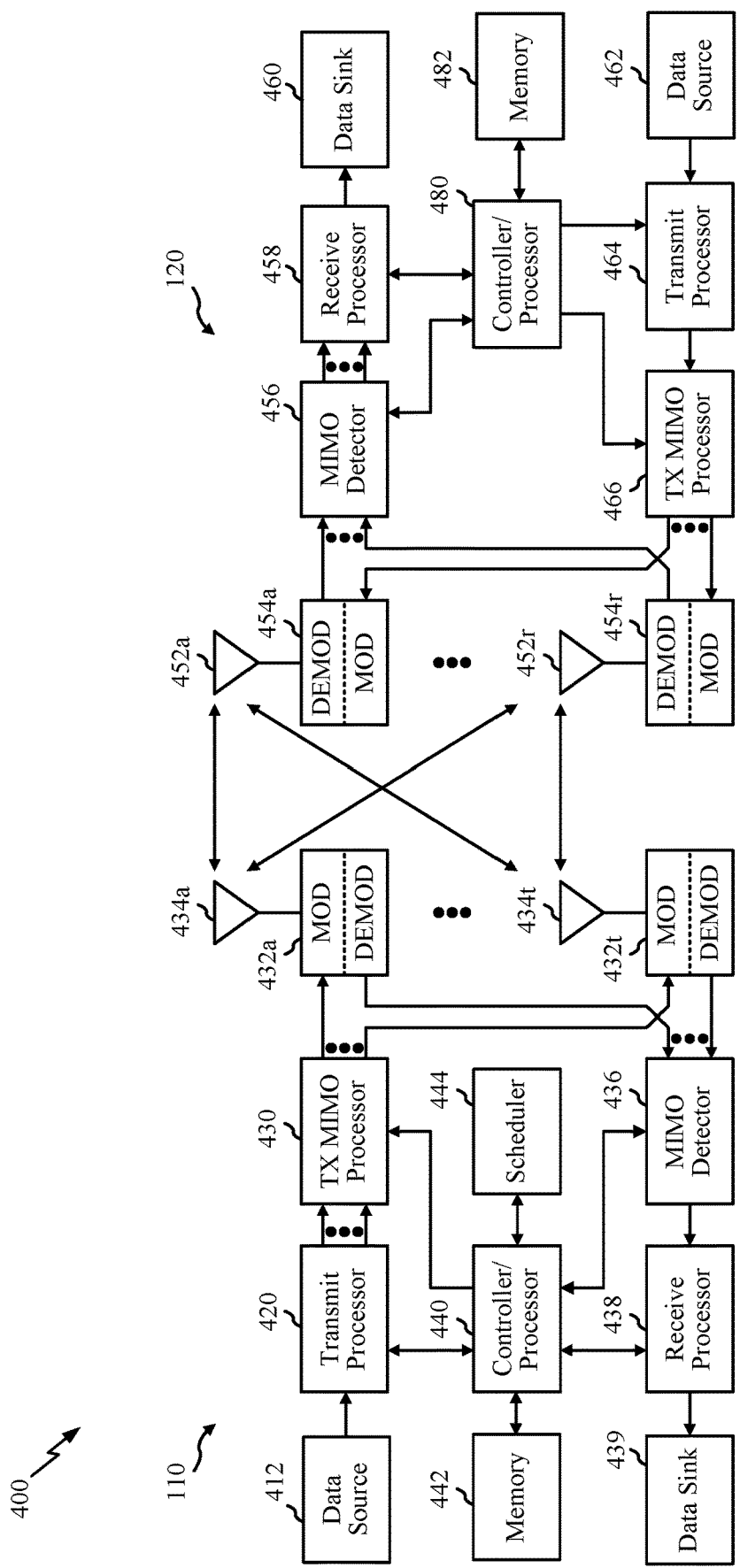
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in the wireless communication network 110 of FIG. 1), which may be used to implement aspects of the present disclosure. For example, antennas 452, processors 466, 458, 464, and/or controller/processor 480 of the UE 120 may be used to perform (or cause the UE 120 to perform) operations 700 of FIG. 7 and/or antennas 434, processors 420, 430, 438, and/or controller/processor 440 of the BS 110 may be used to perform (or cause the UE 120 to perform) operations 800 of FIG. 8.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 432a through 432t may be transmitted via the antennas 434a through 434t, respectively.

At the UE 120, the antennas 452a through 452r may receive the DL signals from the BS 110 and may provide received signals to the demodulators (DEMODs) in transceivers 454a through 454r, respectively. Each demodulator in transceivers 454a through 454r may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the UL, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (RS) (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the BS 110. At the BS 110, the UL signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the DL and/or UL.

Figure 5:
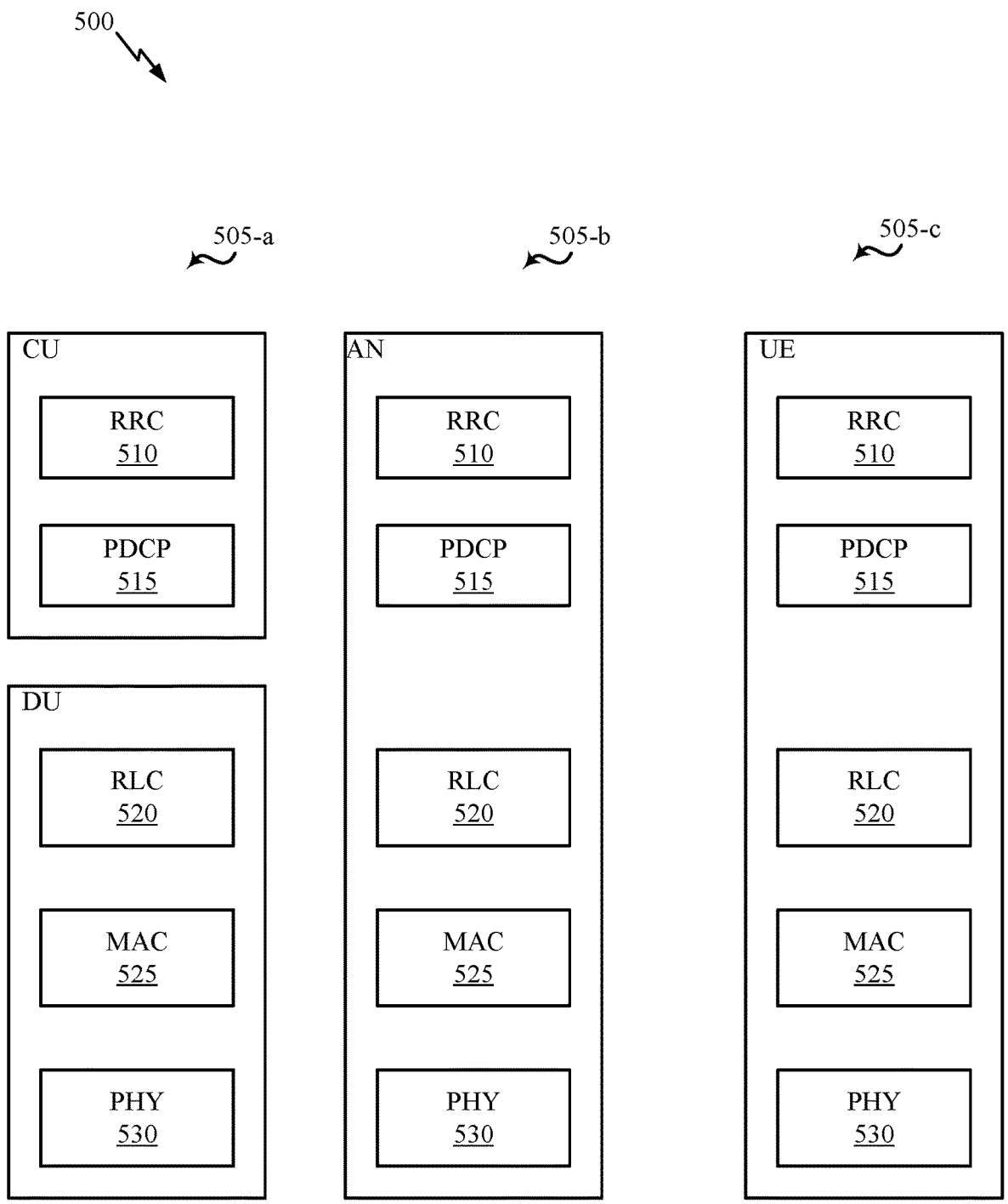
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing (SCS). The NR RB is 12 consecutive frequency subcarriers. NR may support a base SCS of 15 KHz and other SCS may be defined with respect to the base SCS, for example, 30 kHz, 60 kHz, 120 kHz, 240 kHz, etc. The symbol and slot lengths scale with the SCS. The CP length also depends on the SCs.

Figure 6:
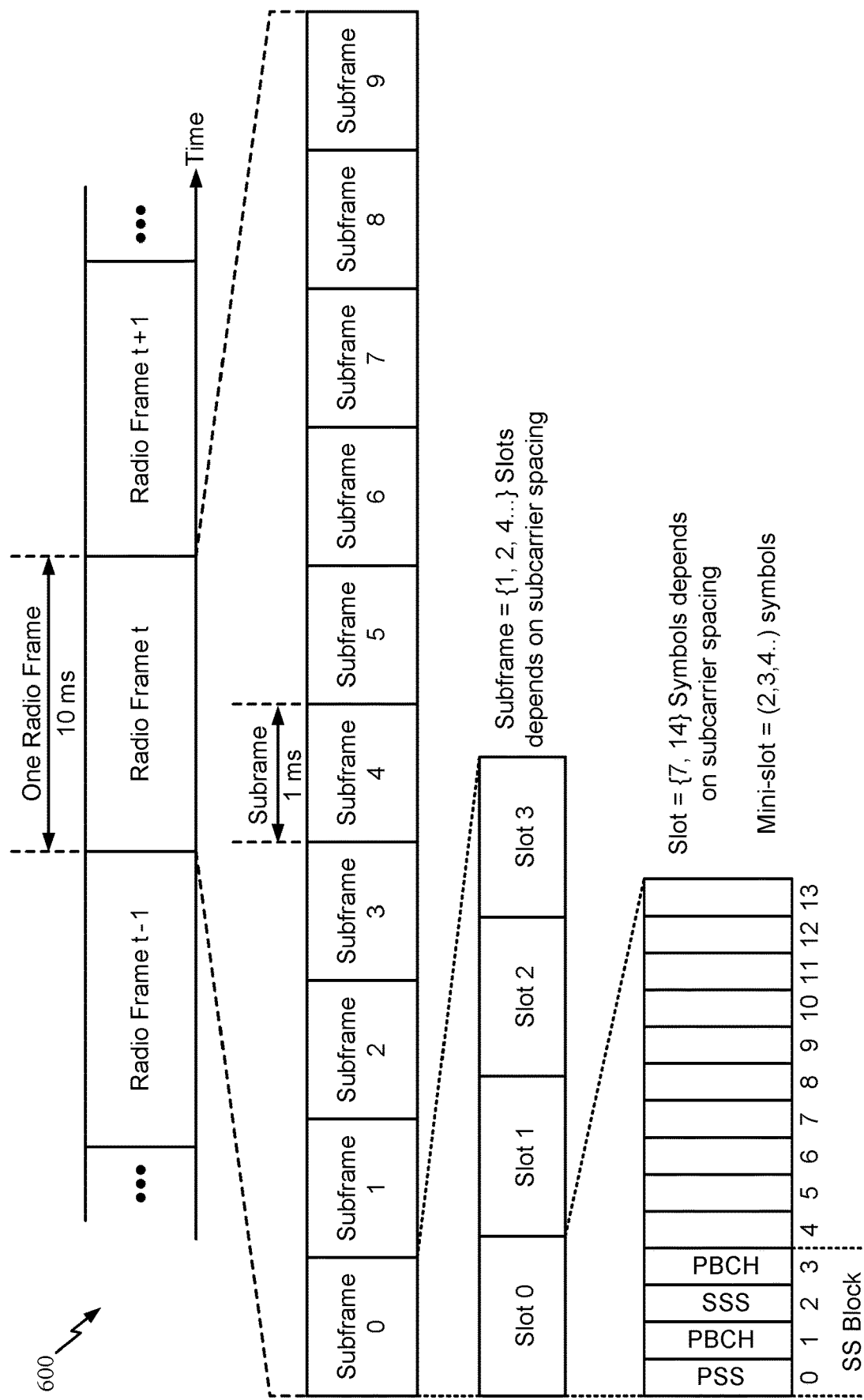
FIG. 6 illustrates an example of a frame format for a new radio (NR) system, in accordance with certain aspects of the present disclosure.

FIG. 6 is a diagram showing an example of a frame format 600 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. The SSB includes a PSS, a SSS, and a two symbol PBCH. The SSB can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into synchronization signal (SS) bursts to support beam sweeping. Further system information such as, remaining minimum system information (RMSI), system information blocks (SIBs), other system information (OSI) can be transmitted on a physical downlink shared channel (PDSCH) in certain subframes. The SSB may be transmitted up to sixty-four times, for example, with up to sixty-four different beam directions for mmW. The up to sixty-four transmissions of the SSB are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a RRC dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Idle Mode Discontinuous Reception (I-DRX) with Wake-Up Signals

Power saving techniques, such as a discontinuous reception (DRX) mode, may allow a wireless node, such as a UE, to enter a low power mode for durations in which the wireless node does not transmit and/or receive and to exit the low power mode for durations in which the wireless node monitors for transmissions and/or sends transmissions. For example, a power savings configuration may allow the wireless node to power off one or more radio frequency (RF) components, including baseband processing components, RF RX front end components (e.g., referred to as a receive (RX) chain) and RF TX front end components (e.g., referred to as a transmit (TX) chain), when not in use in order to save power.

A UE may be configured with a DRX functionality that controls the UE's physical downlink control channel (PDCCCH) monitoring activity. Two types of DRX processes may be used in either RRC_Idle or RRC_Connected states. When a UE is in an Idle mode, a UE may reduce power consumption by powering down some RF components and monitor for PDCCH paging occasions (POs) per paging cycle. Hence, I-DRX may commonly be referred to as a Paging Cycle.

When a UE is configured with I-DRX (e.g., paging mechanism), the UE may cycle through ON periods (e.g., ON durations) and OFF periods (e.g., OFF durations) based on configured cycles. When the UE is in a DRX OFF duration, the UE may remain in a low power (sleep) state referred and stop monitoring transmissions (e.g., PDCCH on the access link). During the OFF duration, the UE may not be expected to transmit and/or receive any signal.

Additionally, the UE may periodically wake up during DRX ON durations, powering on RF components to monitor PDCCH for the presence of a paging occasion (PO). A PO generally refers to an interval (e.g., a subframe) where the UE may be paged via a PDCCH with cyclic redundancy check (CRC) scrambled by a paging radio network temporary identifier (P-RNTI) indicating a subsequent paging message. One Paging Frame (PF) is one Radio Frame, which may contain one or multiple Paging Occasion(s). When DRX is used the UE needs only to monitor one PO per DRX cycle.

Where a PDCCH indicates that a paging message is transmitted on a PDSCH in the subframe, the UE may need to demodulate the PDSCH to determine whether the paging message is directed for that UE. Where a paging message is not directed for the UE, the UE may power RF components back down.

Example Enhanced Paging Procedure in NR

As described above, in some scenarios, a UE may be able to power down certain RF components and wake-up (power on the RF components) to monitor for PDCCH transmissions during POs.

For example, during IDLE (LTE/NR) or INACTIVE (NR) mode operations, a UE may monitor a paging channel to receive paging message from a BS (eNB/gNB). If the UE is to be paged, the BS may send a PDCCH (a downlink control information (DCI) with cyclic redundancy check (CRC) scrambled by a paging radio network temporary identifier or P-RNTI) and a corresponding physical downlink shared channel (PDSCH) (e.g., paging message).

P-RNTI may be common for all UEs, while the actual identity (e.g., International mobile subscriber identity or IMSI) of the paged UE may be included in the paging message. Thus, a UE may need to successfully decode the paging message to determine whether it is being paged.

Unlike LTE, which has always-on RSs (cell-specific reference signals or CRS) that a UE may monitor to maintain timing synchronization (channel tracking), NR does not have such always-on RSs. Rather, in NR, dedicated (UE-specific) RS resources may be assigned for CONNECTED mode UEs via RRC signaling. For IDLE/INACTIVE mode UEs, synchronization signal (SS)/physical broadcast channel (PBCH) blocks may be used for channel tracking and cell search/reselection for paging.

However, SSB density may be much lower than CRS density in LTE. Thus, the paging performance and power consumption for NR may be impacted. In some cases, the closest SSB may be far apart from the PO (e.g., significantly later in time such that it impacts the UE's performance and power consumption). Thus, the UE may need to stay on (with RF components powered on) during the time gap between the SSB and the PO, or the UE may need to wake-up multiple times separately to monitor for SSBs and POs.

Unfortunately, a UE in an IDLE/INACTIVE mode often may not have enough resources for maintaining synchronization to the BS. Accordingly, paging enhancements have been considered in advanced systems (e.g., for NR Rel-17). For example, such enhancements may include means for providing tracking reference signal or channel state information reference signal (TRS/CSI-RS) resources to IDLE/INACTIVE mode UEs.

The TRS/CSI-RS resources may be shared between CONNECTED and IDLE/INACTIVE mode UEs. IDLE/INACTIVE mode UEs may use the TRS/CSI-RS resources, in addition to or in place of SSBs, to reduce power consumption for paging channel monitoring. By locating TRS/CSI-RS close to a PO, the total wake-up duration of a UE (and/or the number of wake-up occasions) may be reduced. However, with this approach, the configuration of periodic TRSs/CSI-RSs for IDLE/INACTIVE mode UEs may be resource intensive. As an example, the periodic TRSs/CSI-RSs may always be transmitted regardless of actual paging, which may cause waste if there are no CONNECTED mode UEs sharing the same TRSs/CSI-RSs.

Further, in certain frequency ranges (e.g., Frequency Range 2 (FR2) that includes frequency bands from 24.25 GHz to 52.6 GHz), paging messages may be transmitted with repetition over different beams. In such cases, configuring separate TRSs/CSI-RSs for all beams may require a significant amount of resources.

In some cases, to alleviate strain on the resources, aperiodic TRSs/CSI-RSs (A-TRSs/CSI-RSs) for IDLE/INACTIVE mode UEs may be considered. In conventional systems, aperiodic TRSs/CSI-RSs may be triggered only when needed (e.g., when there is actual paging). Unfortunately, aperiodic TRSs/CSI-RSs may only be supported for CONNECTED mode UEs, and there are currently no available means for triggering A-TRSs/C SI-RSs for IDLE mode UEs.

Aspects of the present disclosure, however, provide techniques that may allow for an enhanced paging procedure. As will be described in greater detail, additional signals (e.g., A-TRSs or repeated paging messages) may be indicated in a PO. A UE may use these additional signals to enhance processing of a paging message.

Figure 7:
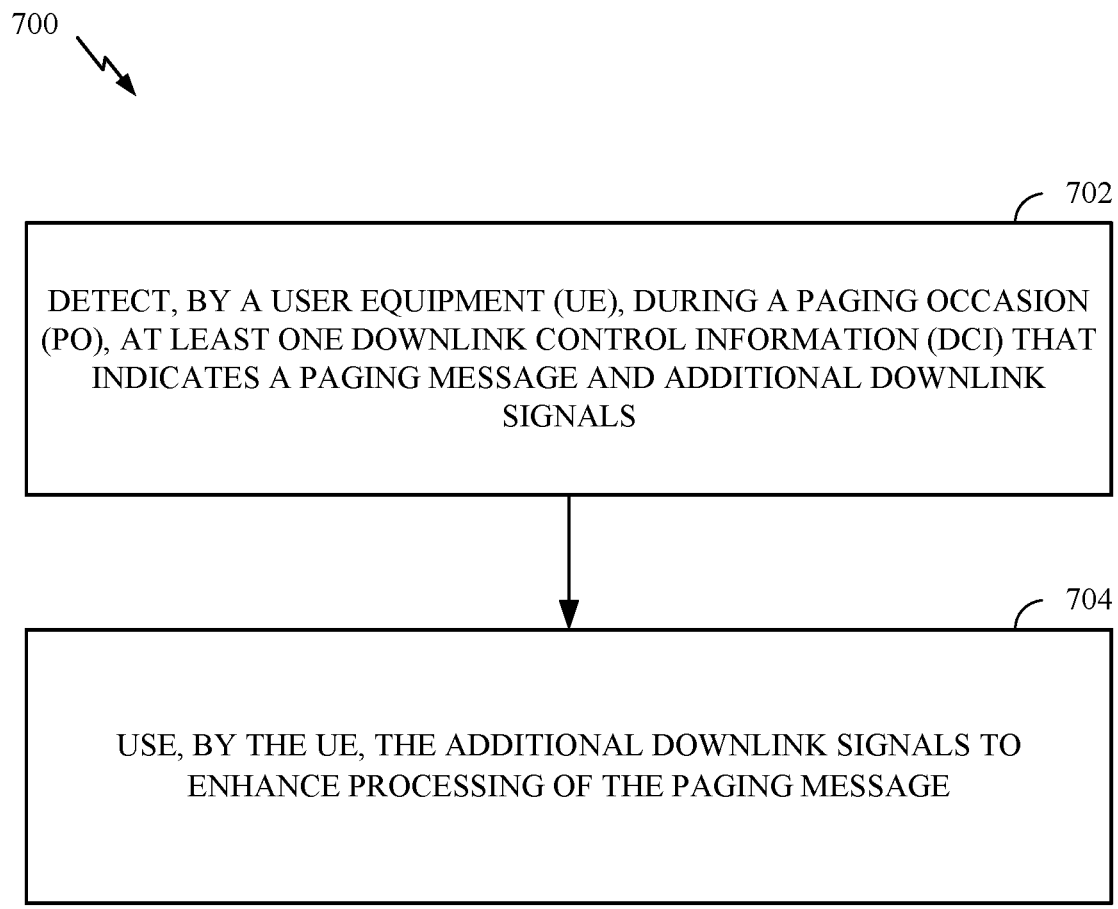
FIG. 7 illustrates example operations for wireless communications by a user equipment, in accordance with certain aspects of the present disclosure.

FIG. 7 illustrates example operations 700 for wireless communications by a UE. For example, operations 700 may be performed by a UE as part of an enhanced paging procedure in accordance with aspects of the present disclosure. The operations 700 may be implemented as software components that are executed and run on one or more processors (e.g., controller/processor 480 of FIG. 4). Further, the transmission and reception of signals by the UE in operations 700 may be enabled, for example, by one or more antennas (e.g., antennas 452 of FIG. 4). In certain aspects, the transmission and/or reception of signals by the UE may be implemented via a bus interface of one or more processors (e.g., controller/processor 480 of FIG. 4) obtaining and/or outputting signals.

The operations 700 begin at 702 by a UE detecting, during a PO, at least one DCI that indicates a paging message and additional downlink (DL) signals. At 704, the UE uses the additional DL signals to enhance processing of the paging message.

Figure 8:
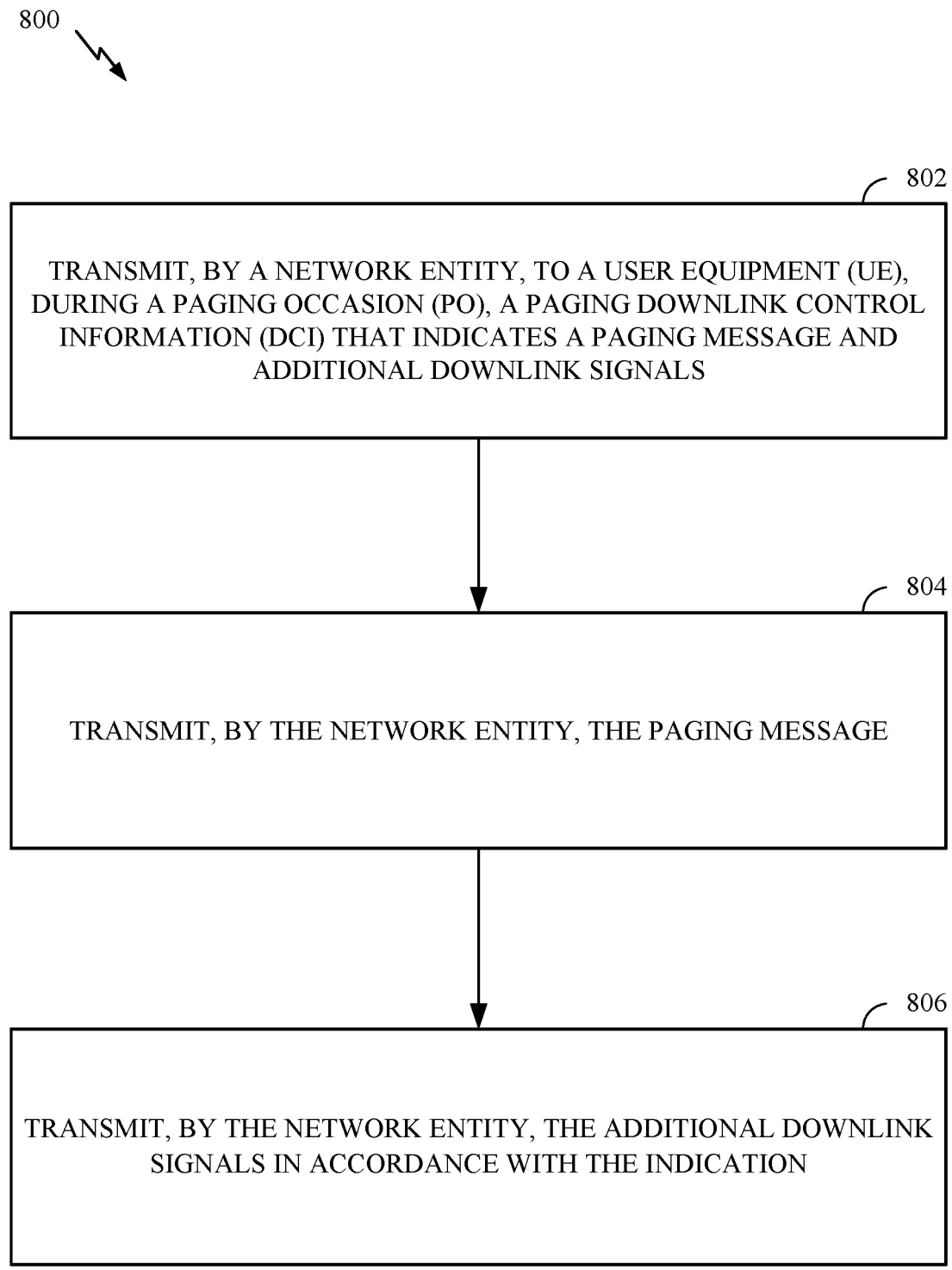
FIG. 8 illustrates example operations for wireless communications by a network entity, in accordance with certain aspects of the present disclosure.

FIG. 8 illustrates example operations 800 for wireless communications by a network entity which may be considered complementary to operations 700 of FIG. 7. For example, operations 800 may be performed by a network entity (e.g., BS) to page a UE performing operations 700 of FIG. 7. The operations 800 may be implemented as software components that are executed and run on one or more processors (e.g., controller/processor 440 of FIG. 4). Further, the transmission and reception of signals by the network entity in operations 800 may be enabled, for example, by one or more antennas (e.g., antennas 434 of FIG. 4). In certain aspects, the transmission and/or reception of signals by the network entity may be implemented via a bus interface of one or more processors (e.g., controller/processor 440 of FIG. 4) obtaining and/or outputting signals.

The operations 800 begin at 802 by transmitting to a UE, during a PO, a paging DCI that indicates a paging message and additional DL signals. At 804, the network entity transmits the paging message. At 806, the network entity transmits the additional DL signals in accordance with the indication.

In some cases, the paging DCI or a separate DCI may indicate an additional tracking resource (e.g., A-TRS). In some cases, a paging DCI (i.e., PDCCH with CRC scrambled by P-RNTI) may trigger A-TRSs. For example, a reserved bit (or fields) in an existing paging DCI (DCI format 1_0) may be used. In an example, a "Short Message" field may have 8 bits, where only 2 of the 8 bits are currently (in Rel-15/16) used, while the other 6 bits reserved. These reserved bits may be used to indicate A-TRSs.

As an alternative, a new DCI format or RNTI may be defined (e.g., only for Rel-17+ UEs). In some cases, this new DCI format may be used only for A-TRS triggering, in addition to the legacy paging DCI (which may continue to be used to indicate the paging message). A PDCCH similar to a "Short Message" may be used. In other cases, the new DCI format may include both the paging DCI and A-TRSs triggering information.

In some cases, one or more fields for the A-TRS indication may include an index of A-TRS resources (which may be pre-determined or pre-configured). In some cases, one or more fields for the A-TRS indication may include a triggering offset (e.g., as a time gap between the DCI and the A-TRS).

The triggered A-TRS may be located within the same slot as the paging message (e.g., PDSCH) or after the slot of the paging message. If the A-TRS and paging message are in the same slot, the UE may perform rate-matching for the paging message around the A-TRS.

In some cases, as an alternative, or in addition to indicating A-TRSs, a paging DCI (or separate DCI) may indicate that the same paging signals (the PDCCH carrying the DCI and/or the PDSCH (e.g., paging message)) may be repeated. For example, the same paging PDCCH/PDSCH may be repeated thereby enabling the UE to use the repetition of the PDCCH or paging message (e.g., the UE may use multiple looks of the same signal) for timing synchronization and performance improvement (e.g., by combining).

In some cases, the repeated paging PDCCH/PDSCH may be consecutive. In some cases, the repeated paging PDCCH/PDSCH may be offset from the previous paging signal (e.g., spaced apart by an offset). In such cases, the paging DCI (or other DCI) may indicate the offset and/or a number of repetitions.

Depending on the implementation, A-TRSs or repetition-based enhanced paging procedures may be implemented. In some cases, a combination of both A-TRSs and repetition-based enhanced paging procedures may be implemented.

Figure 9:
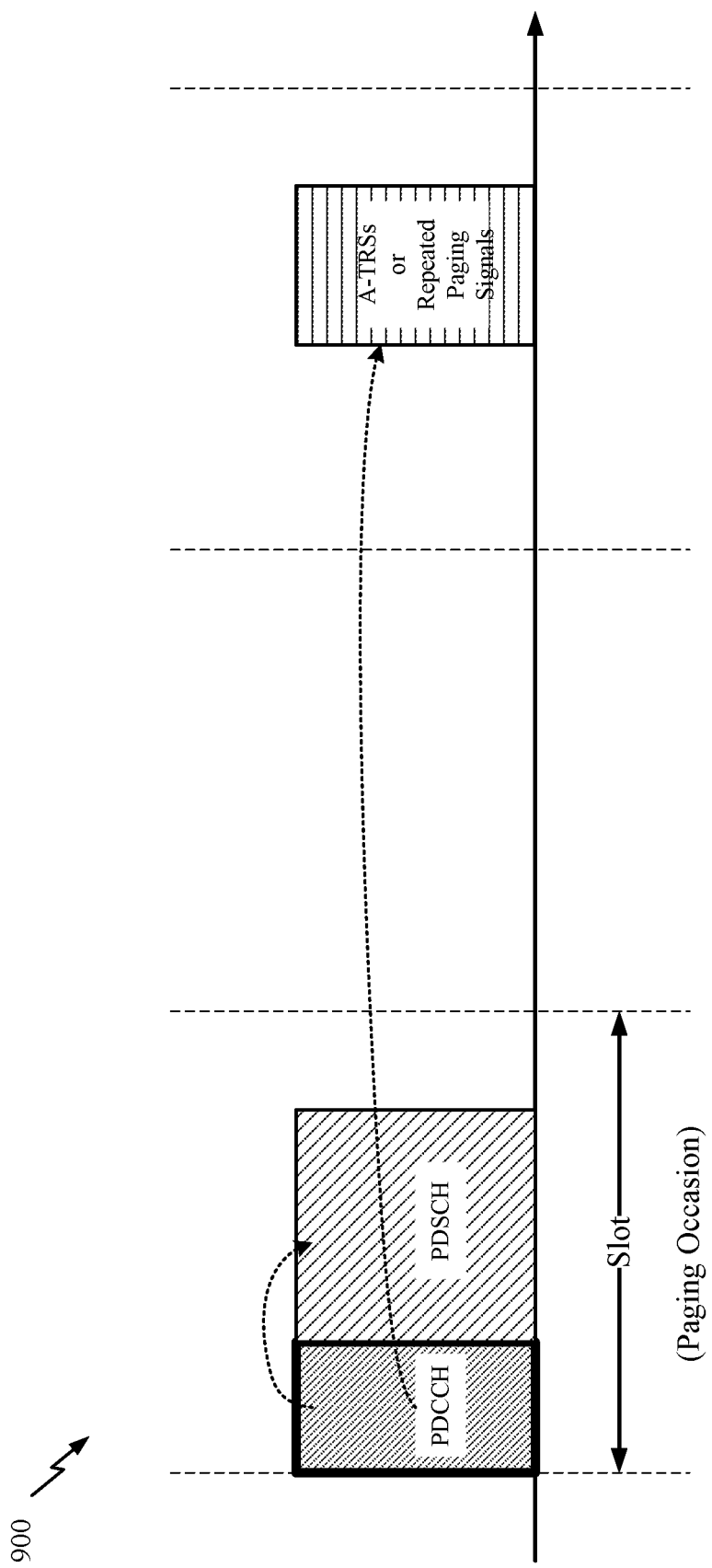
FIG. 9 illustrates an example timeline for an enhanced paging procedure, in accordance with certain aspects of the present disclosure.

FIG. 9 illustrates an example timeline for an enhanced paging procedure, in accordance with aspects of the present disclosure. As shown in FIG. 9, a UE may monitor a PO, during IDLE/INACTIVE mode operations, for a PDCCH with CRC scrambled by P-RNTI. The PDCCH with CRC scrambled by P-RNTI may indicate a paging message (e.g., PDSCH). As illustrated, the PDCCH may also indicate additional signals, such as A-TRSs or repeated paging signals (e.g., PDCCH/PDSCH).

In some implementations, the UE may perform offline processing of the paging signals (e.g., the PDCCH and PDSCH in FIG. 9). For example, the UE may wake up (and power on RF front end (RFFE) components) at the beginning of a PO, buffer signals received (RX signals) during the PO, and then turn off the RFFE components. The UE may then perform offline processing (with RFFE components turned off) of the buffered RX signals to determine whether the UE has been paged or not.

When an A-TRS is indicated in the paging DCI, the UE may first process the paging DCI part of the buffered data (RX signals). Because the DCI (PDCCH carrying DCI) is rather robust to synchronization error, the DCI may be successfully decoded without the aid of the A-TRS.

If the UE detects A-TRS triggering in the DCI, the UE may turn on the RFFE components at the indicated occasion to receive an A-TRS. The UE may recover precise synchronization with the A-TRS, then return to the buffered data and process the paging message (PDSCH). Improved timing (e.g., Fast Fourier Transformation (FFT) window timing) and frequency information may be applied for improved performance.

In the case of paging signal repetition, the UE may again first process the paging DCI part of the buffered data. If the UE detects a repetition indication in the DCI, the UE may turn on the RFFE components at the indicated occasion of the repetition. When receiving the repetition, the UE may apply a different RFFE configuration (e.g., the UE may vary the Automatic Gain Control (AGC) gain, the RX beam, or the like). The UE may buffer the repeated paging signals (PDCCH/PDSCH) and perform offline processing. For example, the UE may perform combining and/or selection (e.g., selecting a repetition with the best decoding metrics). Alternatively, the UE may calculate a phase difference between two repetitions that may be used for fine frequency synchronization.

Example Wireless Communication Devices

Figure 10:
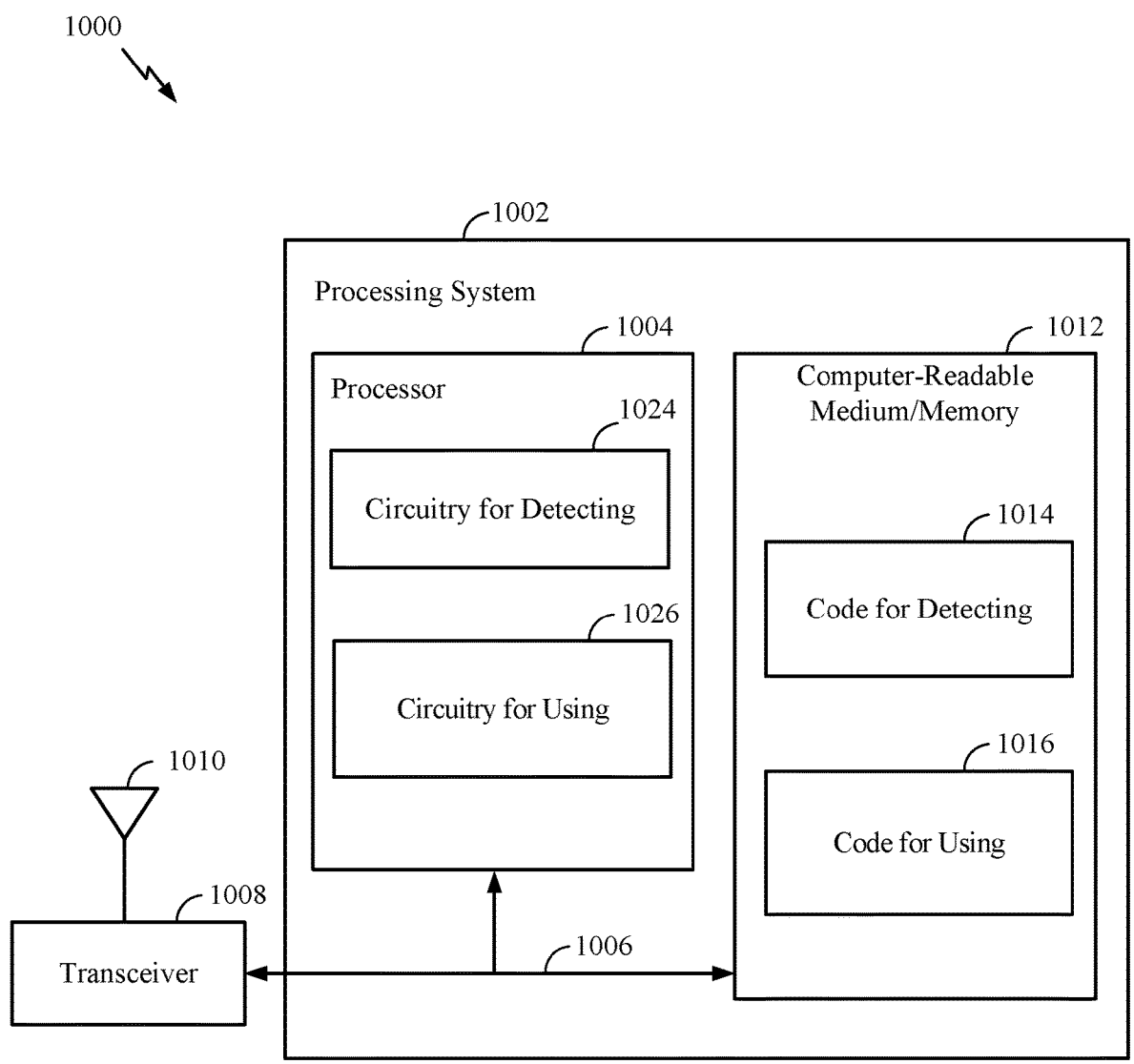
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations 700 illustrated in FIG. 7.

Communications device 1000 includes a processing system 1002 coupled to a transceiver 1008 (e.g., a transmitter and/or a receiver). Transceiver 1008 is configured to transmit and receive signals for the communications device 1000 via an antenna 1010, such as the various signals as described herein. Processing system 1002 may be configured to perform processing functions for the communications device 1000, including processing signals received and/or to be transmitted by the communications device 1000.

Processing system 1002 includes a processor 1004 coupled to a computer-readable medium/memory 1012 via a bus 1006. In certain aspects, computer-readable medium/memory 1012 is configured to store instructions (e.g., computer-executable code) that when executed by the processor 1004, cause the processor 1004 to perform the operations 700 illustrated in FIG. 7, or other operations for performing the various techniques discussed herein. In some cases, the processor 1004 can include one or more components of UE 120 with reference to FIG. 4 such as, for example, controller/processor 480, transmit processor 464, receive processor 458, and/or the like. Additionally, in some cases, computer-readable medium 1012 can include one or more components of UE 120 with reference to FIG. 4 such as, for example, memory 482 and/or the like.

In certain aspects, computer-readable medium/memory 1012 stores code 1014 for detecting and code 1016 for using.

In some cases, code 1014 for detecting may include code for detecting, during a paging occasion (PO), at least one downlink control information (DCI) that indicates a paging message and additional downlink signals.

In some cases, code 1016 for using may include code for using the additional downlink signals to enhance processing of the paging message.

In certain aspects, processor 1004 has circuitry configured to implement the code stored in the computer-readable medium/memory 1012. For example, processor 1004 includes circuitry 1024 for detecting and circuitry 1026 for using.

In some cases, circuitry 1024 for detecting may include circuitry for detecting, during a paging occasion (PO), at least one downlink control information (DCI) that indicates a paging message and additional downlink signals.

In some cases, circuitry 1026 for using may include circuitry for using the additional downlink signals to enhance processing of the paging message.

In some cases, the operations illustrated in FIG. 7, as well as other operations described herein, may be implemented by one or more means-plus-function components. For example, in some cases, such operations may be implemented by means for detecting and means for using.

In some cases, means for detecting and means for using, includes a processing system, which may include one or more processors, such as the receive processor 458, the transmit processor 464, the TX MIMO processor 466, and/or the controller/processor 480 of the UE 120 illustrated in FIG. 4 and/or the processing system 1002 of the communication device 1000 in FIG. 10.

Figure 11:
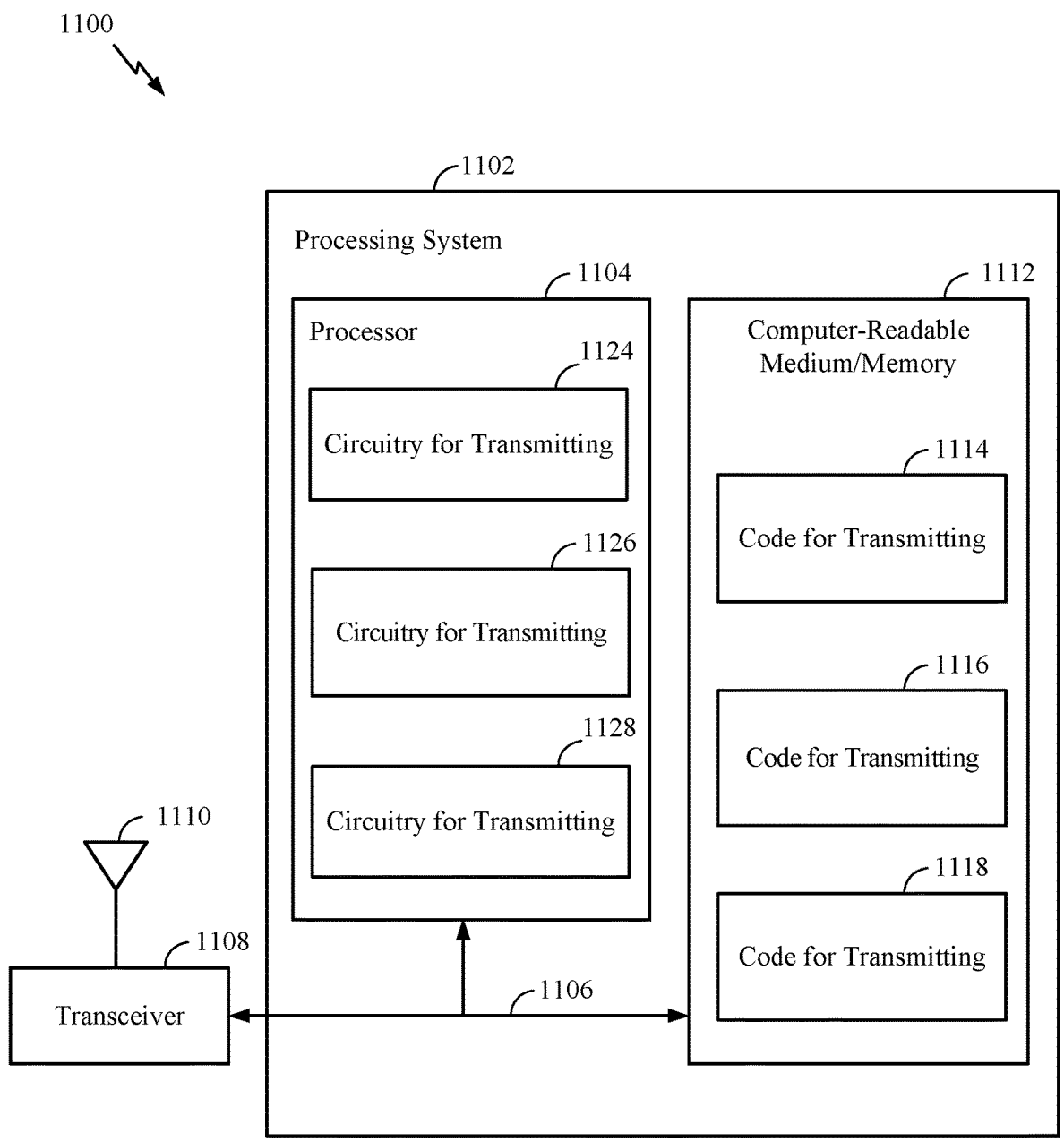
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations 800 illustrated in FIG. 8.

Communications device 1100 includes a processing system 1102 coupled to a transceiver 1108 (e.g., a transmitter and/or a receiver). Transceiver 1108 is configured to transmit and receive signals for the communications device 1100 via an antenna 1110, such as the various signals as described herein. Processing system 1102 may be configured to perform processing functions for the communications device 1100, including processing signals received and/or to be transmitted by the communications device 1100.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by the processor 1104, cause the processor 1104 to perform the operations 800 illustrated in FIG. 8, or other operations for performing the various techniques discussed herein. In some cases, the processor 1104 can include one or more components of BS 110 with reference to FIG. 4 such as, for example, controller/processor 440, transmit processor 420, receive processor 438, and/or the like. Additionally, in some cases, the computer-readable medium/memory 1112 can include one or more components of BS 110 with reference to FIG. 4 such as, for example, memory 442 and/or the like.

In certain aspects, computer-readable medium/memory 1112 stores code 1114 for transmitting; code 1116 for transmitting; and code 1118 for transmitting.

In some cases, code 1114 for transmitting may include code for transmitting to a UE, during a PO, a paging DCI that indicates a paging message and additional downlink signals.

In some cases, code 1116 for transmitting may include code for transmitting the paging message.

In some cases, code 1118 for transmitting may include code for transmitting the additional downlink signals in accordance with the indication.

In certain aspects, processor 1104 has circuitry configured to implement the code stored in the computer-readable medium/memory 1112. For example, processor 1104 includes circuitry 1124 for transmitting; circuitry 1126 for transmitting; and circuitry 1128 for transmitting.

In some cases, circuitry 1124 for transmitting may include code for transmitting to a UE, during a PO, a paging DCI that indicates a paging message and additional downlink signals.

In some cases, circuitry 1126 for transmitting may include code for transmitting the paging message.

In some cases, circuitry 1128 for transmitting may include code for transmitting the additional downlink signals in accordance with the indication.

In some cases, the operations illustrated in FIG. 8, as well as other operations described herein, may be implemented by one or more means-plus-function components. For example, in some cases, such operations may be implemented by means for transmitting (or means for outputting for transmission.

In some cases, means for transmitting (or means for outputting for transmission) includes a transmitter and/or an antenna(s) 434 or the BS 110 illustrated in FIG. 4 and/or circuitry 1124, 1126, and 1128 for transmitting of the communication device 1100 in FIG. 11.

Example Clauses

Implementation examples are described in the following numbered clauses:

Clause 1: A method for wireless communications by a user equipment (UE), comprising: detecting, during a paging occasion (PO), at least one downlink control information (DCI) that indicates a paging message and additional downlink signals; and using the additional downlink signals to enhance processing of the paging message.

Clause 2: The method of Clause 1, wherein the UE: powers on radio frequency (RF) components and buffers signals during the PO; powers down the RF components to process the buffered signals to detect the paging DCI; powers back on the RF components to process the additional downlink signals; and uses results of processing the additional downlink signals to process at least the buffered signals to detect the paging message.

Clause 3: The method of Clause 1 or 2, wherein: the additional downlink signals comprise aperiodic tracking reference signals (A-TRSs); and using the additional downlink signals to enhance processing of the paging message comprises performing channel tracking based on the A-TRSs before processing the paging message.

Clause 4: The method of Clause 3, wherein the DCI indicates the A-TRSs via one or more previously reserved bits or fields in an existing paging DCI format.

Clause 5: The method of Clause 3 or 4, wherein: a DCI of a first format indicates the paging message; and a DCI of a second format indicates the A-TRSs.

Clause 6: The method of any of Clauses 3-5, wherein at least one DCI comprises: a new DCI format, different than an existing paging DCI format, that indicates the paging message and the A-TRSs.

Clause 7: The method of any of Clauses 3-6, wherein the A-TRSs are indicated via a format of the DCI or a radio network temporary identifier (RNTI) used to scramble the paging DCI.

Clause 8: The method of any of Clauses 3-7, wherein the DCI indicates an index of A-TRS resources.

Clause 9: The method of Clause 8, wherein the DCI indicates a time gap between the paging DCI and the A-TRSs.

Clause 10: The method of any of Clauses 3-9, wherein: the A-TRSs are located in a same slot as the paging message; and the UE performs rate matching for the paging message around the A-TRS.

Clause 11: The method of any of Clauses 1-10, wherein: the additional downlink signals comprise at least one repetition of a physical downlink control channel (PDCCH) carrying the paging DCI or a repetition of the paging message; and using the additional downlink signals to enhance processing of the paging message comprises at least one of using the repetition of the PDCCH or paging message for timing synchronization or combining.

Clause 12: The method of Clause 11, wherein: a DCI of a first format indicates the paging message; and a DCI of a second format indicates the repetition of the paging message.

Clause 13: The method of Clause 11 or 12, wherein at least one DCI comprises: a new DCI format, different than an existing paging DCI format, that indicates the paging message and the repetition of the paging message.

Clause 14: The method of any of Clauses 11-13, wherein the paging DCI indicates an offset and a number of the at least one repetition.

Clause 15: The method of any of Clauses 11-14, wherein the additional downlink signals further comprise aperiodic tracking reference signals (A-TRSs).

Clause 16: A method for wireless communications by a network entity, comprising: transmitting to a user equipment (UE), during a paging occasion (PO), a paging downlink control information (DCI) that indicates a paging message and additional downlink signals; transmitting the paging message; and transmitting the additional downlink signals in accordance with the indication.

Clause 17: The method of Clause 16, wherein: the additional downlink signals comprise aperiodic tracking reference signals (A-TRSs).

Clause 18: The method of Clause 17, wherein the DCI indicates the A-TRSs via one or more previously reserved bits or fields in the paging DCI.

Clause 19: The method of Clause 18, wherein the DCI indicates the A-TRSs via one or more previously reserved bits or fields in an existing paging DCI format.

Clause 20: The method of Clause 18 or 19, wherein: a DCI of a first format indicates the paging message; and a DCI of a second format indicates the A-TRSs.

Clause 21: The method of any of Clauses 18-20, wherein at least one DCI comprises: a new DCI format, different than an existing paging DCI format, that indicates the paging message and the A-TRSs.

Clause 22: The method of any of Clauses 17-21, wherein the DCI indicates an index of A-TRS resources.

Clause 23: The method of Clause 22, wherein the DCI indicates a time gap between the paging DCI and the A-TRSs.

Clause 24: The method of any of Clauses 17-23, wherein: the A-TRSs are located in a same slot as the paging message; and the network entity performs rate matching for the paging message around the A-TRSs.

Clause 25: The method of any of Clauses 16-24, wherein: the additional downlink signals comprise at least one repetition of a physical downlink control channel (PDCCH) carrying the paging DCI or a repetition of the paging message; and the paging DCI indicates an offset and a number of the at least one repetition.

Clause 26: The method of Clause 25, wherein: a DCI of a first format indicates the paging message; and a DCI of a second format indicates the repetition of the paging message.

Clause 27: The method of any of Clauses 18-26, wherein at least one DCI comprises: a new DCI format, different than an existing paging DCI format, that indicates the paging message and the repetition of the paging message.

Clause 28: The method of Clause 27, wherein the additional downlink signals further comprise aperiodic tracking reference signals (A-TRSs).

Clause 29: An apparatus for wireless communications by a user equipment (UE), comprising: a memory comprising computer-executable instructions; and one or more processors configured to execute the computer-executable instructions and cause the one or more processors to: detect, during a paging occasion (PO), at least one downlink control information (DCI) that indicates a paging message and additional downlink signals; and use the additional downlink signals to enhance processing of the paging message.

Clause 30: An apparatus for wireless communications by a network entity, comprising: a memory comprising computer-executable instructions; and one or more processors configured to execute the computer-executable instructions and cause the one or more processors to: transmit to a user equipment (UE), during a paging occasion (PO), a paging downlink control information (DCI) that indicates a paging message and additional downlink signals; transmit the paging message; and transmit the additional downlink signals in accordance with the indication.

Additional Considerations

The preceding description provides examples of an enhanced paging procedure. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7 and FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   detecting, during a paging occasion (PO), at least one downlink control information (DCI) that indicates a paging message and additional downlink signals, wherein the additional downlink signals comprise aperiodic tracking reference signals (A-TRSs); and
   using the additional downlink signals to enhance processing of the paging message, comprising performing channel tracking based on the A-TRSs before processing the paging message.

2. The method of claim 1, wherein the UE:
   powers on radio frequency (RF) components and buffers signals during the PO;
   powers down the RF components to process the buffered signals to detect the paging DCI;
   powers back on the RF components to process the additional downlink signals; and
   uses results of processing the additional downlink signals to process at least the buffered signals to detect the paging message.

3. The method of claim 1, wherein the DCI indicates the A-TRSs via one or more previously reserved bits or fields in an existing paging DCI format.

4. The method of claim 1, wherein:
   a DCI of a first format indicates the paging message; and
   a DCI of a second format indicates the A-TRSs.

5. The method of claim 1, wherein at least one DCI comprises:
   a new DCI format, different than an existing paging DCI format, that indicates the paging message and the A-TRSs.

6. The method of claim 1, wherein the A-TRSs are indicated via a format of the DCI or a radio network temporary identifier (RNTI) used to scramble the paging DCI.

7. The method of claim 1, wherein the DCI indicates an index of A-TRS resources.

8. The method of claim 7, wherein the DCI indicates a time gap between the paging DCI and the A-TRSs.

9. The method of claim 1, wherein:
   the A-TRSs are located in a same slot as the paging message; and
   the UE performs rate matching for the paging message around the A-TRS.

10. A method for wireless communications by a user equipment (UE), comprising:
    detecting, during a paging occasion (PO), at least one downlink control information (DCI) that indicates a paging message and additional downlink signals, wherein the additional downlink signals comprise at least one repetition of a physical downlink control channel (PDCCH) carrying the paging DCI or a repetition of the paging message; and
    using the additional downlink signals to enhance processing of the paging message, comprising at least one of using the repetition of the PDCCH or paging message for timing synchronization or combining.

11. The method of claim 10, wherein:
    a DCI of a first format indicates the paging message; and
    a DCI of a second format indicates the repetition of the paging message.

12. The method of claim 10, wherein at least one DCI comprises:
    a new DCI format, different than an existing paging DCI format, that indicates the paging message and the repetition of the paging message.

13. The method of claim 10, wherein the paging DCI indicates an offset and a number of the at least one repetition.

14. The method of claim 10, wherein the additional downlink signals further comprise aperiodic tracking reference signals (A-TRSs).

15. A method for wireless communications by a network entity, comprising:
    transmitting to a user equipment (UE), during a paging occasion (PO), a paging downlink control information (DCI) that indicates a paging message and additional downlink signals;
    transmitting the paging message; and
    transmitting the additional downlink signals in accordance with the indication, wherein:
    the additional downlink signals comprise aperiodic tracking reference signals (A-TRSs),
    the A-TRSs are located in a same slot as the paging message, and
    the network entity performs rate matching for the paging message around the A-TRSs.

16. The method of claim 15, wherein the DCI indicates the A-TRSs via one or more previously reserved bits or fields in the paging DCI.

17. The method of claim 16, wherein the DCI indicates the A-TRSs via one or more previously reserved bits or fields in an existing paging DCI format.

18. The method of claim 16, wherein:
a DCI of a first format indicates the paging message; and
a DCI of a second format indicates the A-TRSs.

19. The method of claim 16, wherein at least one DCI comprises:
a new DCI format, different than an existing paging DCI format, that indicates the paging message and the A-TRSs.

20. The method of claim 15, wherein the DCI indicates an index of A-TRS resources.

21. The method of claim 20, wherein the DCI indicates a time gap between the paging DCI and the A-TRSs.

22. A method for wireless communications by a network entity, comprising:
transmitting to a user equipment (UE), during a paging occasion (PO), a paging downlink control information (DCI) that indicates a paging message and additional downlink signals;
transmitting the paging message; and
transmitting the additional downlink signals in accordance with the indication, wherein the additional downlink signals comprise at least one repetition of a physical downlink control channel (PDCCH) carrying the paging DCI or a repetition of the paging message, and wherein the paging DCI indicates an offset and a number of the at least one repetition.

23. The method of claim 22, wherein:
a DCI of a first format indicates the paging message; and
a DCI of a second format indicates the repetition of the paging message.

24. The method of claim 22, wherein at least one DCI comprises:
a new DCI format, different than an existing paging DCI format, that indicates the paging message and the repetition of the paging message.

25. The method of claim 24, wherein the additional downlink signals further comprise aperiodic tracking reference signals (A-TRSs).

26. An apparatus for wireless communications by a user equipment (UE), comprising:
a memory comprising computer-executable instructions; and
one or more processors configured to execute the computer-executable instructions and cause the one or more processors to:
detect, during a paging occasion (PO), at least one downlink control information (DCI) that indicates a paging message and additional downlink signals, wherein the additional downlink signals comprise aperiodic tracking reference signals (A-TRSs); and
use the additional downlink signals to enhance processing of the paging message, comprising performing channel tracking based on the A-TRSs before processing the paging message.

27. An apparatus for wireless communications by a network entity, comprising:
a memory comprising computer-executable instructions; and
one or more processors configured to execute the computer-executable instructions and cause the one or more processors to:
transmit to a user equipment (UE), during a paging occasion (PO), a paging downlink control information (DCI) that indicates a paging message and additional downlink signals;
transmit the paging message; and
transmit the additional downlink signals in accordance with the indication, wherein:
the additional downlink signals comprise aperiodic tracking reference signals (A-TRSs),
the A-TRSs are located in a same slot as the paging message, and
the network entity performs rate matching for the paging message around the A-TRSs.

28. An apparatus for wireless communications by a user equipment (UE), comprising:
a memory comprising computer-executable instructions; and
one or more processors configured to execute the computer-executable instructions and cause the one or more processors to:
detect, during a paging occasion (PO), at least one downlink control information (DCI) that indicates a paging message and additional downlink signals, wherein the additional downlink signals comprise at least one repetition of a physical downlink control channel (PDCCH) carrying the paging DCI or a repetition of the paging message; and
use the additional downlink signals to enhance processing of the paging message, comprising at least one of using the repetition of the PDCCH or paging message for timing synchronization or combining.

29. An apparatus for wireless communications by a network entity, comprising:
a memory comprising computer-executable instructions; and
one or more processors configured to execute the computer-executable instructions and cause the one or more processors to:
transmit to a user equipment (UE), during a paging occasion (PO), a paging downlink control information (DCI) that indicates a paging message and additional downlink signals;
transmit the paging message; and
transmit the additional downlink signals in accordance with the indication, wherein the additional downlink signals comprise at least one repetition of a physical downlink control channel (PDCCH) carrying the paging DCI or a repetition of the paging message, and wherein the paging DCI indicates an offset and a number of the at least one repetition.

* * * * *